United States Patent [19]

Carlson et al.

[11] Patent Number: 5,294,253
[45] Date of Patent: Mar. 15, 1994

[54] CARBON BLACK SYSTEM AND IMPROVED RUBBER STOCK

[75] Inventors: Douglas W. Carlson, Kingwood; William D. Breach, Humble, both of Tex.

[73] Assignee: Hydril Company, Houston, Tex.

[21] Appl. No.: 56,821

[22] Filed: May 3, 1993

Related U.S. Application Data

[63] Continuation-in-part of Ser. No. 972,623, Nov. 6, 1992, abandoned.

[51] Int. Cl.$^5$ ................................................ C09C 1/44
[52] U.S. Cl. ............................... 106/475; 106/472; 106/476; 106/477; 524/212; 524/213; 524/215; 524/216; 524/495; 524/496; 526/340
[58] Field of Search ............... 106/472, 475, 476, 477; 524/212, 213, 215, 216, 296, 495, 496; 526/340

[56] References Cited

U.S. PATENT DOCUMENTS

| | | | |
|---|---|---|---|
| 3,761,577 | 9/1973 | Dahmen et al. | 423/450 |
| 4,289,743 | 9/1981 | Ruble | 423/450 |
| 4,431,704 | 2/1984 | Springer | 428/450 |
| 5,132,357 | 7/1992 | Endter et al. | 524/495 |

OTHER PUBLICATIONS

Carlson, Doug and George C. Derringer, "Computer-Assisted Compounding Methods", *Rubber & Plastic News,* (Mar. 2, 1992) pp. 15–17.
*The Vanderbilt Rubber Handbook,* 13th Ed. (1990) pp. 604–606, 663, 653, 668, 721, 737, 770.
*Polysar Book* (probably late 1970, early 1980) "Applications for Krynac Oil Resistant Rubbers".
*Hycar®* Elastomers "Annular and Ram Blowout Preventer Elements" no date available.
*Hycar®* "Pipe Wiper Elements" no date avail.
*Hycar®* Elastomers "Swab Cups" no date avail.

*Primary Examiner*—Mark L. Bell
*Assistant Examiner*—Scott L. Hertzog
*Attorney, Agent, or Firm*—Vaden, Eickenroht, Thompson, Boulware & Feather

[57] ABSTRACT

An improved rubber stock with a unique carbon black system including mismatched pairs of furnace blacks with fumed silica and a silane coupler has been developed. The carbon black system includes a mixture of large and small particles with high and low structure carbon black pairs. The carbon black system compounded with polar and nonpolar rubber provides products with a range of desirable characteristics using only two carbon blacks.

13 Claims, No Drawings

CARBON BLACK SYSTEM AND IMPROVED RUBBER STOCK

This application is a continuation-in-part of application Ser. No. 07/972,623, filed Nov. 6, 1992, now abandoned.

BACKGROUND AND SUMMARY OF THE INVENTION

Carbon black is a form of elemental carbon and it can be produced in varying particle sizes and structures. Structure is the degree of particle coalescence and agglomeration with a high structure carbon black having more particles agglomerated into random structures than does a low structure carbon black. Particle size and structure affect various qualities in rubber such as elongation, modulus, tear strength, tensile strength and resilience. Carbon blacks are used with both polar and nonpolar rubbers to enhance these qualities. Rubber stocks containing larger particle blacks display good resilience, but tend to be deficient in tensile strength and elongation. Conversely, rubber stocks containing small particle blacks display good tensile strength and elongation, but have poor resilience qualities. High structure carbon blacks improve the modulus and extrudability of rubber stock. The low structure blacks improve the resilience characteristics of rubber stocks. The carbon blacks in the middle ranges provide stocks that have average characteristics. Manufacturing techniques for carbon blacks have been perfected so that large or small particle carbon blacks with either high or low structure can be prepared.

Carbon blacks are graded by ASTM designation D 1765 standard classification. There are at least four types of carbon blacks, including furnace blacks, lamp blacks, thermal blacks and channel blacks. Furnace blacks are not modified to alter their inherent properties on rubber cure rates. Lamp blacks or lamp black substitutes have modified surfaces that affect the cure rate of rubber. Thermal blacks include very large particle blacks. These blacks are manufactured by incomplete combustion of natural gas. Channel blacks are also produced by incomplete combustion of natural gas. The carbon particles which are intermediate in size, are deposited on steel channels over the flame. The surface of the particle is not altered to affect rubber cure rate. The structure of blacks is defined by the n-Dibutyl Phthalate Absorption number (DBP number) and is measured by the D 2414 test method. The larger the DBP number the higher the structure. Particle size is defined by Iodine Adsorption Number and is measured by ASTM D 1510 test method. There is an inverse relationship between the iodine number and particle size; the higher the number the smaller the particle.

In manufacturing rubber products a carbon black with certain structure and particle size is used to enhance a certain desired characteristic while sacrificing others. For instance, a large particle black will be used to achieve desired compression characteristics at the expense of tear and modulus. Combinations of carbon blacks with the same size, but different structures have been used together. Using carbon blacks with the same size characteristics limits flexibility in varying qualities in the rubber products. However, utilizing carbon blacks with different sizes has generally been avoided because the mixture of different sizes of carbon blacks are deemed incompatible.

A rubber products manufacturer selects a carbon black from those with different size and structure to make a product with varying characteristics. Even so, utilizing one type of carbon black or pairs matched for size, limits the qualities achieved in the rubber, because the enhancement of certain qualities is detrimental to others. Recommended formulations for transmission belting for engines, hydraulic hose tubes and wire and cable jackets include mixtures of large particle carbon blacks to provide desired compression characteristics. *The Vanderbilt Rubber Handbook*, R. T. Vanderbilt Co., Inc.; Norwalk, Conn.; 13th Ed. (1990) pp. 653, 721. Other formulations for high hardness rubber mix furnace blacks with large particle thermal blacks. Id. at 770. Typical formulations for seals include a matched pair of large particle carbon blacks with high and low structure. Id. at 737. Mixtures of carbon blacks with similar size and structure are used in some applications. For example, two large particle and low structure carbon blacks have been recommended for a tire body formulation. Id. at 606. Tire treads, on the other hand, contain small particle carbon blacks. Id. at 604, 605. The large particle and low structure is desired for resilience qualities in the tire body. The tread utilizes small particles with better tensile strength.

The present invention is a unique pairing of furnace carbon blacks with disparate qualities to provide a system that can be manipulated to produce rubber with balanced optimum qualities. Specifically, the carbon black system is a mixture of a pair of furnace carbon blacks. The pairs are mismatched according to size and structure. One of the carbon blacks has a DBP number of less than 110 and the other has a DBP number of greater than 110 to provide a mix of structures. The pairs are also mismatched according to size with one of the pair with an iodine adsorption of greater than 110 and the other with less than 110. The two carbon blacks are used together with the ratio of one to another not to exceed 3:1. The ratio is varied according to the qualities desired. The use of the mismatched carbon black pairs mixed with rubber stock has produced an improved rubber product with good compression and resilience characteristics generally attributed to the use of large carbon black particles in a rubber while retaining the good elongation, modulus, tear and tensile strength attributable to the presence of small carbon black particles. Similarly there is a mix of structures with the mix of particle size. The use of the unique carbon black system produces a rubber composition with a combination of all the optimum qualities of the large and small particles and high and low structure. The combination of resilience as well as good elongation, modulus, tear and tensile strength has been attained.

The carbon black system also includes, in combination with the mismatched carbon blacks, a fumed silica and silane coupler. Fumed silica has a much smaller particle size than precipitated silica which is also used in rubber processing. Silica increases tear strength. Fumed silica is expensive and builds viscosity in the rubber. Silane couplers used in conjunction with silica decrease elongation, but sometimes can produce excessively high modulus elongation. Silane couplers are used in an effective amount with the fumed silica in ranges known to those skilled in the art. A typical ratio is 10:1 fumed silica to silane coupler. The fumed silica is used in a 12.5% to 50% by weight to the combined weight of the carbon black pair.

The carbon blacks can be selected according to the parameters of this invention to maximize the desired properties of polar and nonpolar rubbers. Different types of cures for the rubber can be used with the carbon black system of this invention including sulfur and sulfur donor cures depending on the rubber stock. The use of the unique carbon black pairs with silica/silane system allows the manufacturer to maintain a minimal stock of carbon blacks and produce rubber products with a range of qualities. The unique carbon black pairs eliminate the need to maintain a range of different size and structure carbon blacks for manufacturing purposes.

The use of the mismatched carbon black pairs with a fumed silica and silane coupler produces unique rubber compositions. The carbon black system is mixed with the selected rubber stock and cured. The carbon black mixture comprises from about 40 parts per hundred to about 80 parts per hundred of the selected rubber. The rubber compositions, both polar and nonpolar rubber, have as the carbon black constituent not only both high and low structure carbon blacks with DBP numbers greater than and less than 110 respectively, but also larger and small particle carbon blacks with Iodine Adsorption Numbers of less than and greater than 110 respectively. The use of the new carbon black system produces a new rubber composition as described herein.

Carbon blacks are given an ASTM designation with the letter "N" used to indicate typical furnace blacks that receive no special surface modification to alter their influence on the rate of cure. The second character in the nomenclature is a digit to designate particle size with lower digits indicating smaller particles. The third and fourth characters are assigned arbitrarily, however the full designation of each of the carbon blacks assigned by the ASTM describes the carbon black as to particle size and the structure. For example, one of the mismatched pairs is ASTM D1765 designations N231 a small particle (121 Iodine Adsorption No.) and low structure ( DBP No. 92) and N550 a large particle (43 Iodine Adsorption No.) and high structure (DBP No. 121). By varying the amount of N231 and N550 within the range of 3 parts N231 to 1 part N550 or 1 part N231 to 3 parts N550, rubber stocks can be provided with varying characteristics in acceptable ranges for different rubber products. Accordingly, the rubber products manufacturer can stock a limited number of carbon blacks and produce a variety of rubber stocks.

DETAILED DESCRIPTION OF THE INVENTION

The carbon black system is a mixture of a pair of furnace carbon blacks with one pair having a low structure with a DBP No. of less than 110 and the other with a high structure with a DBP No. of greater than 110. The pair is also mismatched as to size with a large particle carbon black with an Iodine Adsorption No. of less than 110 and the other with an Iodine Adsorption No. of greater than 110. Excluded from the carbon black system of this invention are the extremely large thermal blacks such as N990 that have an Iodine No. of 10 or less. The carbon black system also includes fumed silica and an effective amount of a silane coupler.

The carbon black system is used with polar and nonpolar rubber. The nonpolar rubbers include natural rubber and styrene-butadiene rubber (SBR). Polar rubber such as nitrile rubber (NBR) is used. Different rubber stocks benefit from the carbon black system of the invention because the use of two mismatched pairs of carbon black can be varied to provide different desired characteristics to the rubber.

The fumed silica used with the carbon black pairs is commercially available and known to those skilled in the art. An example is a fumed colloidal silica made by Cabot Corporation, Boston, Mass. and sold under the trademark Cab-o-Sil ®. The fumed silica is used with an effective amount of a silane coupler. Components of the carbon black system of this invention and other additives are measured by parts per hundred weight of the rubber polymer used (sometimes referred to as "phr") . The fumed silica is used in about 10 to about 20 parts per hundred of the selected rubber polymer. In the preferred embodiments the silane coupler used is bis,3, (triethoxysilyl)-propyl-tetrasulfide used with the fumed silica in a 10:1 ratio silica to silane coupler, however other silanes are effective.

The carbon blacks are mixed with neither of the pair exceeding the other in a 3:1 ratio with the preferred ratio of 2:1. The mismatched carbon blacks can be varied within the ratio to achieve the desired characteristics of the end rubber product. The carbon blacks are used in about 40 to about 80 parts per hundred per weight of rubber stock.

Additives known to those skilled in the art can be used with the carbon black system of this invention including antioxidants, antiozonants, processing oils and plasticizers. Also, cure systems known to those skilled in the art for the rubber stock selected are used in this invention.

Nitrile rubber is used for many industrial applications. The following Table 1 is a summary of characteristics for nitrile rubber stock with two mismatched carbon pairs that are exemplary of the invention. One of the pairs of the furnace carbon blacks is N231, which is a small particle black (Iodine No. 121) with low structure (DBP No. 92) and the other is N550, which is a large particle black (Iodine No. 43) with high structure (DBP No. 121). The other mismatched pair is a N234 which is a small particle black (Iodine No. 120) with high structure (DBP No. 125) and N774 which is a large particle black (Iodine No. 29) with low structure (DBP No. 72).

Table 1 summarizes data for modulus, set, tensile strength, elongation and tear strength for the mismatched carbon black pairs used with the fumed silica and silane coupler. The fumed silica was used in 15 parts per hundred weight of the selected rubber stock and the coupler was used in 1.5 parts per hundred weight. Nitrile rubber stock was prepared with the mismatched pairs in varying ratios with the amount of each pair from 20 to 30 to 40 parts per hundred. Table 1 summarizes the properties of the nitrile rubber with the various mismatched pairs in different combinations to illustrate the range of values for the carbon black system of the invention.

A comparison of the mismatched pairs to two sets of matched pairs as well as comparisons to individual carbon blacks used alone are shown in Table 1. The matched pairs of carbon black are similar in size but different in structure. For instance, N550 is a large particle black (Iodine No. 43) with high structure (DBP No. 121) and N774 is a large particle black (Iodine No. 29) with low structure (DBP No. 72). Another matched pair is N231 which is a small particle black (Iodine No. 121) with low structure (DBP No. 92) and N234 which is a small particle black (Iodine No. 120) with high structure (DBP No. 125). The matched carbon black pairs were used with the fumed silica or silane coupler. The matched carbon black pairs were prepared in varying ratios from 20 to 30 to 40 parts per hundred similar to the mismatched pairs. Individual carbon blacks were also used at 60 parts per hundred of nitrile rubber with the fumed silica and silane coupler of the carbon black system of the present invention.

In the examples shown in Table 1 the rubber stocks were cured for thirty minutes with an elemental sulfur cure that produces polysulfidic cross links.

seven percent can be reached while at the same time attaining a modulus value ($M_{300}$) of 2200 psi without loading high amounts of carbon black. Also, elongation can decrease with carbon black loading and the use of the carbon black system of the present invention provides elongation while maintaining the set values. The use of matched carbon black pairs tends to restrict the set values. With the large particle carbon blacks, the set is lower than the desired seven percent. With the small particle carbon blacks the set is higher and can exceed desired values.

TABLE 1

| | NITRILE RUBBER SUMMARY | | | | | | | |
|---|---|---|---|---|---|---|---|---|
| | Column No. | | | | | | | |
| Property | 1 | 2 | 3 | 4 | 5 | 6 | 7 | 8 |
| | N231[1] N550 | N234[2] N774 | N550[3] N774 | N231[4] N234 | N231 60 PHR | N234 60 PHR | N550 60 PHR | N774 60 PHR |
| Modulus $M_{300}$ ASTM D412 - 75 psi | 1170– 2645 | 1360– 2840 | 1310– 2710 | 1305– 2925 | 1790 | 2180 | 2220 | 1630 |
| Set ASTM D412 - 75 Percent | 3.7–9.0 | 5.6–9.6 | 3.1–6.0 | 5.9– 12.8 | 8.2 | 9.6 | 5.4 | 4.0 |
| Tensile Strength ASTM D412 - 75 psi | 3260– 3905 | 3425– 3985 | 3175– 3545 | 3555– 4420 | 3890 | 3805 | 3245 | 3145 |
| Elongation ASTM D412 - 75 Percent | 420– 695 | 495– 690 | 430– 670 | 390– 640 | 595 | 505 | 560 | 630 |
| Tear Strength Die C ASTM D624 - 73 pounds/inch | 250– 285 | 275– 315 | 225– 230 | 250– 270 | 275 | 255 | 245 | 245 |

[1] Mismatched Pair N231 - small particle and low structure; N550 - large particle and high structure.
[2] Mismatched Pair N234 - small particle and high structure; N774 - large particle and low structure.
[3] Matched Pair N550 large particle and high structure; N774 - large particle and low structure.
[4] Matched Pair N231 - small particle and low structure; N234 small particle and high structure.

Columns 1 and 2 of Table 1 present a summary of extreme data for the mismatched pairs N231/N550 and N234/N774. The columns 3 and 4 of Table 1 present data for the pairs N550/N774 and N231/N234 matched according to particle size. The range of carbon black loading in columns 1 through 4 is 40 to 80 phr with 60 phr as the center point. The ratio of the carbon blacks was determined according to a 2 squared factorial design. Tables 2 and 3 contain complete data for nitrile rubber with the varied carbon black loading for the mismatched pairs N231/N550 and N234/N774. Columns 5 through 8 of Table 1 present data for each of the individual carbon blacks used in pairs shown in columns 1 through 4 of Table 1. The loading in columns 5 through 8 is 60 phr, the center point, and is at or near the loading required for maximum tensile strength.

As shown in Table 1, the range of properties for the mismatched pairs in columns 1 and 2 essentially brackets all data in columns 3 through 8, for matched pairs and individual carbon blacks. By comparing tensile strengths, it is obvious that large particle size carbon blacks represented by columns 3,7 and 8 produce lower tensile strength than do small particle size carbon blacks represented by columns 4, 5 and 6. Comparing columns 1 and 2 to these groups proves that mismatched pairs maintain higher tensile strengths. Traditional teaching is that the carbon black producing the lower tensile strength predominates in a mixture. The data in columns 1 and 2 are contrary to this teaching and demonstrate the unique features of this invention.

As shown in Table 1, the use of the carbon black system of this invention can be used to produce rubber stock with desirable characteristics without loading the stock with excessive amounts of carbon black. The amount of each carbon black of the mismatched pairs can be varied to achieve the desired properties for the chosen application. The set values with an optimum of The properties for the nitrile rubber with varied ratios by weight of the mismatched pairs of carbon black from Table 1 are shown below in Tables 2 and 3 to illustrate the flexibility of using only two carbon blacks to produce various types of rubber products.

TABLE 2

| MISMATCHED PAIRS - NITRILE RUBBER N231 Small Particle Low Structure N550 Large Particle High Structure | | | | | |
|---|---|---|---|---|---|
| | N231/N550 parts per hundred (PHR) | | | | |
| Property | Col. 1 20/20 | Col. 2 40/20 | Col. 3 20/40 | Col. 4 40/40 | Col. 5 30/30 |
| Modulus $M_{300}$ ASTM D412 - 75 psi | 1170 | 1855 | 2030 | 2635 | 1940 |
| Set ASTM D412 - 75 Percent | 3.7 | 6.9 | 5.5 | 9.0 | 5.8 |
| Tensile Strength ASTM D412 - 75 psi | 3905 | 3480 | 3375 | 3260 | 3455 |
| Elongation ASTM D412 - 75 Percent | 695 | 570 | 545 | 420 | 565 |
| Tear Strength Die C ASTM D624 - 73 pounds/inch | 250 | 285 | 250 | 265 | 265 |

Table 2 presents the detailed measurements for each loading level of the mismatched carbon black pair N231/N550 in nitrile rubber. The unique feature of Table 2 is the consistency of data for blends of N231 and N550 ranging from 40/20 to 20/40 as shown in columns 2,3,5.

The measured modulus, $M_{300}$ for each of the blends is 1855, 2030 and 1940 with a measuring error of about ±100 psi. Traditional teaching in the art suggests that high modulus is developed by the use of high structure black i.e. N550, however these results are contrary to that teaching. Conversely, teaching in the art holds that high structure blacks produce high set (lower resilience) again the mismatched pairs demonstrate an unusual effect.

TABLE 3

MISMATCHED PAIRS - NITRILE RUBBER
N234 Small Particle High Structure
N774 Large Particle Low Structure

| | N234/N774 parts per hundred | | | | |
|---|---|---|---|---|---|
| Property | Col. 1 20/20 | Col. 2 40/20 | Col. 3 20/40 | Col. 4 40/40 | Col. 5 30/30 |
| Modulus $M_{300}$ ASTM D412 - 75 psi | 1360 | 2170 | 2080 | 2840 | 1980 |
| Set ASTM D412 - 75 Percent | 5.6 | 7.7 | 6.0 | 9.6 | 6.3 |
| Tensile strength ASTM D412 - 75 psi | 3985 | 3740 | 3545 | 3425 | 3615 |
| Elongation ASTM D412 - 75 Percent | 690 | 610 | 615 | 495 | 595 |
| Tear Strength Die C ASTM D624 - 73 pounds/inch | 265 | 315 | 280 | 305 | 275 |

The pair of carbon blacks in Table 3 above are mismatched, but as opposed to N231/N550 the pair N234/N774 reverses the structure relationship, i.e. the small particle carbon black N234, is the high structure carbon black. Table 1 shows that at 60 phr loading, N234 yields a tensile strength of 3805 psi, while N774 yields 3145 psi. These results would be expected by a rubber chemist of ordinary skill in the art. Examination of columns 2, 3 and 5 (all at 60 phr loading) shows that tensile strength for the blends is within the range 3650±100 psi. This result is unexpected. Table 1 also shows that N234 yields a set of 9.6 percent while N774 yields a set of 4.0 percent. These are commonly expected results. Columns 2, 3 and 5 present data lying within the range 6.7±1.0 percent demonstrating that the invention provides for high tensile strength coupled with low set and high resilience.

A carbon black system of this invention can be used with nitrile rubber with a sulfur donor cure rather than the elemental sulfur cure of the nitrile rubber examples shown in Tables 1, 2 and 3. The mismatched pair used was N110 small particle (Iodine No. 145) with high structure (DBP No. 113) and N660 large particle (Iodine No. 36) and low structure (DBP No. 90). Table 4 shows the properties of nitrile with a sulfur donor cure of 1.27 phr MORFAX, 4-Morpholinyl-2-benzothiazole; 1.27 phr VANAX-A, 4,4'-dithiodimorpholine and 1.00 phr Ethyl Tuads, tetraethylthiuran dissulfide that are products manufactured by R. T. Vanderbilt.

The coupler was used in 1.4 phr and the fumed silica was used in 20 phr.

TABLE 4

MISMATCHED PAIRS - NITRILE RUBBER
N110 Small Particle High Structure
N660 Large Particle Low Structure

| | N110/N660 parts per hundred | | | | | |
|---|---|---|---|---|---|---|
| Property | Col. 1 20/20 | Col. 2 30/20 | Col. 3 20/30 | Col. 4 30/30 | Col. 5 25/25 | Col. 6 44.5/0 |
| Modulus $M_{300}$ ASTM D412 - 75 psi | 1530 | 2050 | 1990 | 2515 | 1910 | 1555 |
| Set ASTM D412 - 75 Percent | 4.1 | 5.3 | 4.7 | 6.0 | 5.0 | 5.6 |
| Tensile strength ASTM D412 - 75 psi | 4115 | 3955 | 3880 | 3820 | 3690 | 4100 |
| Elongation D412 - 75 | 605 | 535 | 565 | 500 | 530 | 600 |
| Percent Tear Strength Die C ASTM D624 - 73 pounds/inch | 250 | 270 | 245 | 250 | 240 | 280 |
| Mooney Viscosity ASTM D1648 | 92 | 116 | 103 | 136 | 103 | 126 |
| Scorchtime $t_5$ | 5.4 | 4.5 | 5.1 | 4.1 | 4.9 | 3.9 |
| Durometer hardness ASTM 2240 | 81 | 85 | 83 | 88 | 85 | 82 |

Table 4 is a comparison of various loadings of N110 and N660 in columns 1 through 5 and 44.5 phr of N110 only shown in column 6. Generally, the higher the loading of carbon black the higher viscosity of the rubber. However, the viscosities for the rubbers in columns 2, 3 and 5 of Table 4 have lower viscosity even though the loading is 50 phr as compared to 44.5 phr loading of N110 shown in column 6. The amounts of the mismatched pairs in Table 4 can be varied to produce rubber with varying desired properties. The rubber compounds in columns 2, 3 and 5 of Table 4 have higher modulus than the single carbon black in column 6 while maintaining comparable permanent set.

The cure used in the rubber compounds of Table 4 is a sulfur donor cure. The cure system yields only mono or desulfide linkages which are more heat stable than polysulfidic cross links produced by elemental sulfur cures. Table 4 also includes the scorch time, viscosity and durometer properties. The viscosity of the compounds provides a moldable rubber with sufficient modulus for industrial applications. One such application is the rubber for an annular blow-out preventer used on oil rigs.

The carbon black system of this invention can also be used with nonpolar rubbers such as natural rubber and styrene-butadiene rubber (SBR). The nonpolar rubbers utilize a sulfur cure system as typically applied by those skilled in the art. The rubber stock is cured for 30 minutes. Table 5 contains the properties of a natural rubber stock with mismatched pairs of carbon blacks in various ratios by weight.

TABLE 5

MISMATCHED PAIRS - NATURAL RUBBER
N231 Small Particle Low Structure
N550 Large Particle High Structure

| | N231/N550 parts per hundred | | | | |
|---|---|---|---|---|---|
| Property | Col. 1 12.5/12.5 | Col. 2 25/12.5 | Col. 3 12.5/25 | Col. 4 25/25 | Col. 5 18.7/18.7 |
| Modulus $M_{300}$ ASTM D412 - 75 psi | 950 | 1375 | 1400 | 1960 | 1375 |
| Set ASTM D412 - 75 Percent | 2.5 | 5.0 | 3.6 | 5.5 | 3.7 |
| Tensile strength ASTM D412 - 75 psi | 4010 | 3800 | 3740 | 3545 | 3825 |
| Elongation ASTM D412 - 75 Percent | 660 | 610 | 600 | 525 | 610 |
| Tear Strength Die C ASTM | 525 | 540 | 535 | 670 | 685 |

TABLE 5-continued

MISMATCHED PAIRS - NATURAL RUBBER
N231 Small Particle Low Structure
N550 Large Particle High Structure

| | N231/N550 parts per hundred | | | | |
|---|---|---|---|---|---|
| | Col. 1 | Col. 2 | Col. 3 | Col. 4 | Col. 5 |
| Property | 12.5/12.5 | 25/12.5 | 12.5/25 | 25/25 | 18.7/18.7 |
| D624 - 73 pounds/inch | | | | | |

The data presented in Tables 1, 2, 3 and 4 are based on tests on nitrile rubber stocks. Nitrile rubber is a highly polar rubber noted for its outstanding oil resistance, but it displays poor dynamic resilience. Table 5 presents data for natural rubber, a nonpolar rubber noted for outstanding dynamic resilience, but which displays poor oil resistance.

The pair of carbon blacks shown in Table 5 is N231/N550, a mismatched pair. As opposed to nitrile rubber, the tensile maximum for natural rubber occurs at about 40 phr loading, hence the loading levels for these experiments are in the range of 25-50 phr. Examining columns 2, 3 and 5 in Table 5 for modulus ($M_{300}$) shows the remarkable result that at 37.5 loading the moduli of 1375 and 1400 are essentially identical. Columns 2 and 3 present the unexpected result that at 37.5 phr loading the system responds identically no matter which carbon black predominates. This is important because it allows the use of larger amounts of N550, a lower cost carbon black compared with N231. These data demonstrate the utility of the invention.

Another example of a nonpolar rubber used with the carbon black system is SBR. Table 6 contains the properties of SBR stock with a mismatched carbon black pair.

TABLE 6

MISMATCHED PAIRS - SBR
N231 Small Particle Low Structure
N550 Large Particle High Structure

| | N231/N550 parts per hundred | | | | |
|---|---|---|---|---|---|
| Property | Col. 1 20/20 | Col. 2 40/20 | Col. 3 20/40 | Col. 4 40/40 | Col. 5 30/30 |
| Modulus $M_{300}$ ASTM D412 - 75 psi | 775 | 1250 | 1315 | 1810 | 1305 |
| Set ASTM D412 - 75 Percent | 5.1 | 7.8 | 7.1 | 12.1 | 7.2 |
| Tensile strength ASTM D412 - 75 psi | 2785 | 2650 | 2610 | 2395 | 2660 |
| Elongation ASTM D412 - 75 Percent | 760 | 645 | 610 | 440 | 630 |
| Tear Strength Die C ASTM D624 - 73 pounds/inch | 300 | 315 | 310 | 255 | 295 |

SBR is a commercially important nonpolar synthetic rubber often used as a substitute for natural rubber. Unlike natural rubber, it is not self-reinforcing and requires higher levels of carbon black loading to attain its maximum mechanical properties. The carbon black loading for the tensile maximum is about 60 phr, and the loadings used in this experiment vary from 40 to 80 phr. The pair of mismatched carbon blacks used in Table 6 is N231 and N550.

Columns 2, 3 and 5 of Table 6 present data for stocks loaded with 60 phr of a mismatched pair of carbon blacks at various ratios one to the other. Comparisons of the data show that at 60 phr loading the tensile properties of (measured by ASTM D412) the stock are independent of the ratio of the carbon blacks. This phenomenon allows the compounder to use higher amounts of less costly N550 black. This is a further demonstration of the utility of this invention.

The improved rubber stock of this invention is exemplified by the formulations presented herein. It is not intended to restrict the practice of this invention to the examples or formulations specifically set forth. Those skilled in the art may practice the invention according the parameters described and are not limited by the examples provided.

We claim:

1. A carbon black system for rubber manufacture comprising
   a pair of carbon blacks;
   one of said pair of carbon blacks having a low structure with a DBP No. of less than 110 with the other of said pair having a high structure with a DBP No. of greater than 110;
   one of said pair of carbon blacks having a large particle size with an Iodine Adsorption No. of less than 110 and the other of said pair having a small particle size with an Iodine Adsorption No. of greater than 110;
   a fumed silica; and
   a silane coupler.

2. A carbon black system of claim 1 wherein the ratio of either one of said carbon blacks to the other in the mixture does not exceed 3:1.

3. A carbon black system of claim 1 wherein the fumed silica is 12.5% to 50% by weight of the combined weight of the carbon black pair.

4. A rubber composition comprising
   a rubber selected from the group of polar and nonpolar rubbers;
   a carbon black system comprising a mixture of a pair of furnace carbon blacks;
   one of said pair of carbon blacks having a low structure with a DBP No. of less than 110 with the other of said pair having a high structure with a DBP No. of greater than 110;
   one of said pair of carbon blacks having a large particle size with an Iodine Adsorption No. of less than 110 and the other of said pair having a small particle size with an Iodine Adsorption No. of greater than 110;
   a fumed silica; and
   a silane coupler.

5. A rubber composition of claim 4 wherein the ratio of either one of said carbon blacks to the other in the mixture does not exceed 3:1.

6. A rubber composition of claim 4 wherein the carbon black system is from about 40 parts per hundred to about 80 parts per hundred of the rubber.

7. A rubber composition of claim 4 wherein said fumed silica is from 10 parts per hundred to 20 parts per hundred of the rubber.

8. A rubber composition of claim 4 wherein said nonpolar rubber is selected from the group of styrene-butadiene rubber and natural rubber.

9. A rubber composition of claim 4 wherein said polar rubber is a sulfur cured nitrile rubber.

10. A rubber composition of claim 4 wherein said polar rubber is a sulfur donor cured nitrile rubber.

11. A rubber composition of claim 4 wherein the carbon black system comprises a mixture of N231 and N550 wherein the ratio of either one of said carbon blacks to the other does not exceed 3:1.

12. A rubber composition of claim 4 wherein the carbon black system comprises a mixture of N234 and N774 wherein the ratio of either one of said carbon blacks to the other does not exceed 3:1.

13. A rubber composition of claim 4 wherein the carbon black system comprises a mixture of N110 and N660 wherein the ratio of either one of said carbon blacks to the other does not exceed 3:1.

* * * * *